No. 720,473. PATENTED FEB. 10, 1903.
A. PHELPS.
BADGE BUTTON.
APPLICATION FILED MAY 26, 1900.
NO MODEL. 2 SHEETS—SHEET 1.

WITNESSES:
Henry Krug
C. B. Pitney

INVENTOR:
Augustus Phelps,
BY
Drake &Co.
ATTORNEYS

No. 720,473. PATENTED FEB. 10, 1903.
A. PHELPS.
BADGE BUTTON.
APPLICATION FILED MAY 26, 1900.
NO MODEL. 2 SHEETS—SHEET 2.

WITNESSES:
Henry King
C. B. Pitney

INVENTOR
Augustus Phelps,
BY
Drake & Co
ATTORNEYS.

THE NORRIS PETERS CO., PHOTO-LITHO., WASHINGTON, D. C.

UNITED STATES PATENT OFFICE.

AUGUSTUS PHELPS, OF NEWARK, NEW JERSEY.

BADGE-BUTTON.

SPECIFICATION forming part of Letters Patent No. 720,473, dated February 10, 1903.

Application filed May 26, 1900. Serial No. 18,038. (No model.)

*To all whom it may concern:*

Be it known that I, AUGUSTUS PHELPS, a citizen of the United States, residing at Newark, in the county of Essex and State of New Jersey, have invented certain new and useful Improvements in Badge-Buttons; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to enable the badge-button to be quickly and securely applied to the garment without the expense and trouble incident to the employment of positive locks or catches for the pin-point and to secure other advantages and results, some of which may be referred to hereinafter in connection with the description of the working parts.

The invention consists in the improved badge-button and in the arrangements and combinations of parts of the same, all substantially as will be hereinafter set forth and finally embraced in the clauses of the claim.

Figure 1:
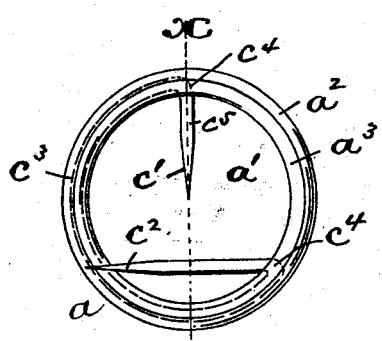
Figure 4:
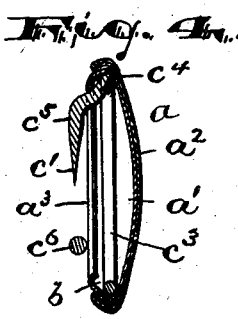
Figure 5:
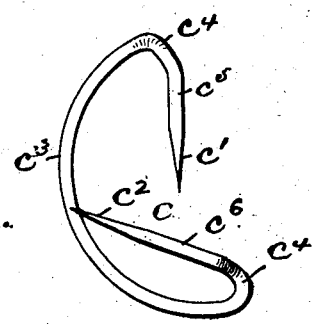
Figure 2:
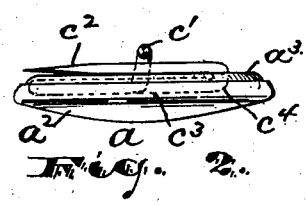
Figure 3:
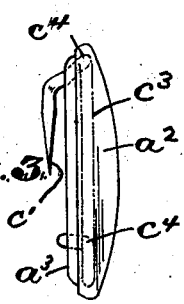
Figure 6:
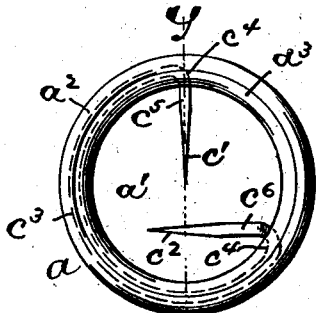
Figures 7, 8:
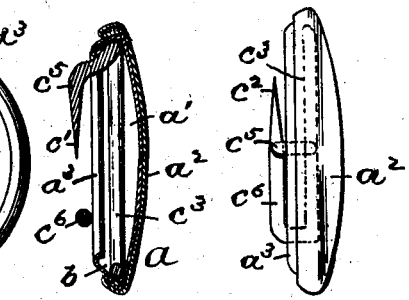
Figure 9:
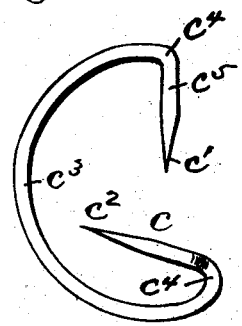
Figure 10:
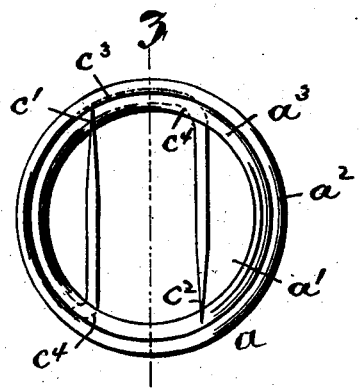
Figure 11:
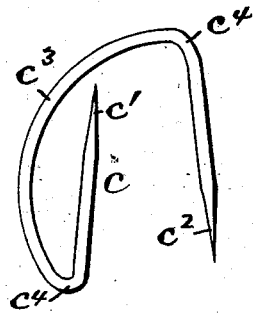
Figure 12:
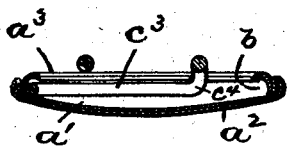
Figure 13:
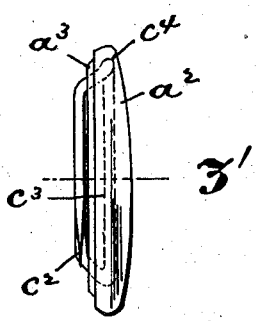
Figure 14:
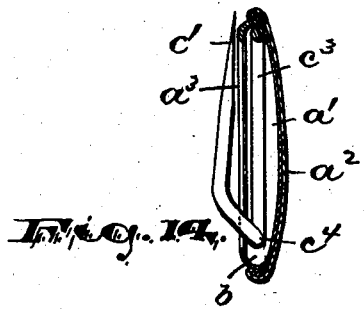

Referring to the accompanying drawings, in which like letters of reference indicate corresponding parts in each of the several figures, Figure 1 is a rear elevation of a badge-button of my improved construction. Figs. 2 and 3 are side views of the same, and Fig. 4 is a section of the same on line $x$. Fig. 5 is a perspective view of the pin, to which the invention more particularly applies. Fig. 6 is a rear elevation showing the button in a somewhat-modified form. Fig. 7 is a section on line $y$, and Fig. 8 is a side view of the same, and Fig. 9 is a detail perspective view of a modified form of pin employed in the latter construction. Fig. 10 illustrates in rear elevation another form of construction of the button, and Fig. 11 is a detail perspective of the pin employed therein. Fig. 13 is a side view of the last said button; and Figs. 12 and 14 are sectional views taken, respectively, through lines $z$ $z'$ of Figs. 10 and 13.

In said drawings, $a$ indicates the body of the button, comprising a concavo front plate $a'$, a covering $a^2$ for the same, which may be provided with a photographic picture or other design, emblem, &c., commonly employed in connection with the buttons of the class to which my invention relates, and a rear plate or collet $a^3$, which serves to hold the covering $a^2$ on the button and forms at the back of the button an annular flange, with a recess or groove $b$ sufficient to receive the fastening-pin. Said fastening-pin $c$ comprises a piece of spring-wire pointed at opposite ends, as at $c'$ $c^2$, the points of both said ends resembling those of an ordinary pin or needle and being such as will enable the pin to be thrust easily through the cloth or textile fabric of an ordinary garment. The pointed parts are connected by a curved part $c^3$, adapted to enter and lie in the said groove, and thus be secured to the button-body, the tendency of the resilient wire being to hug the outer walls of the peripheral groove. Back from the points the wire is bent, as at $c^4$. In the preferred constructions shown in Figs. 1 and 6 the pointed parts lie in chords of the circle of the button, one of said parts (marked $c^5$) extending toward the center of the button and the other of said parts $c^6$ lying in a line at right angles to the line of the first of said parts, so that after the insertion of the diametrical part the other can be inserted by turning the button, using the base of the said diametrical part as the center of turning. By thus inserting the two pins the button cannot be withdrawn from the garment by an ordinary straight pull in any one direction.

In the construction shown in Fig. 10 the pointed pin parts are arranged in parallel chords away from the axial center of the button, and thus when one pin is thrust into the garment to its base it will serve as a center upon which the button may be turned in thrusting the second pin into the garment.

By the constructions thus described the badge-button may be conveniently but securely fastened upon the garment, a single hand being employed in the operation of attaching, and said badge-button when thus attached cannot be readily removed except by careful manipulation.

Having thus described the invention, what I claim as new is—

1. In a badge-button, the combination of a body having a peripheral groove at the rear, and a fastening-pin comprising a piece of resilient wire bent intermediate of its ends into a holding portion adapted to lie in said peripheral groove of the button-body, and having its ends forming substantially straight wire pin-tongues extending inward from said groove behind the button-body in different directions and substantially parallel thereto, each of said pin-tongues being adapted to be thrust through the fabric of a garment up to its base at the periphery of the button, the two said pin-tongues lying in different lines and one of them being disposed in a small chord of the circle of the button-body at a distance from the center of said circle.

2. In a badge-button, the combination of a body having a peripheral groove at the rear, and a fastening-pin comprising a piece of resilient wire bent intermediate of its ends into a holding portion adapted to lie in said peripheral groove of the button-body and having its ends forming substantially straight wire pin-tongues extending inward from said groove behind the button-body in different directions and subtantially parallel thereto, each of said pin-tongues being adapted to be thrust through the fabric of a garment up to its base at the periphery of the button, one of said pin-tongues being disposed in a line which intersects the other pin-tongue and adapted to be inserted into a garment by an edgewise movement of the badge, the said other pin-tongue being adapted to be afterward inserted by a rotary motion of the badge upon a point in the first pin-tongue as a center.

3. In a badge-button, the combination of a body having a peripheral groove at the rear, and a fastening-pin comprising a piece of resilient wire bent intermediate of its ends into a holding portion adapted to lie in said peripheral groove of the button-body and having its ends forming substantially straight wire pin-tongues extending inward from said groove behind the button-body in different directions and substantially parallel thereto, each of said pin-tongues being adapted to be thrust through the fabric of a garment up to its base at the periphery of the button, and the two pin-tongues lying in lines substantially at right angles to each other.

4. As an article of manufacture, a fastening-pin for badge-buttons having a peripherally-recessed back, said pin comprising a piece of resilient wire bent intermediate of its ends into a curved holding portion, necks $c^4$ bent upward at the ends of said holding portion out of the plane thereof and substantially straight pin-tongues formed of the end portions of the wire extending from said necks inward with respect to the curvature of the holding portion and in a plane substantially parallel to the plane of said holding portion, said pin-tongues lying in different lines and necessitating a rotary twisting of the fastening-pin to insert one pin into a garment after the other has been inserted.

5. As an article of manufacture, a fastening-pin for badge-buttons having a peripherally-recessed back, said pin comprising a piece of resilient wire bent intermediate of its ends into a curved holding portion, necks $c^4$ bent upward at the ends of said holding portion out of the plane thereof, and substantially straight pin-tongues formed of the end portions of the wire extending from said necks inward with respect to the curvature of the holding portion and in a plane substantially parallel to the plane of said holding portion, said pin-tongues lying in lines substantially at right angles to each other.

In testimony that I claim the foregoing I have hereunto set my hand this 15th day of May, 1900.

AUGUSTUS PHELPS.

Witnesses:
CHARLES H. PELL,
C. B. PITNEY.